June 2, 1925.  1,540,554
R. T. GRIFFITHS
ACIDPROOF CONTAINER
Filed Oct. 2, 1924
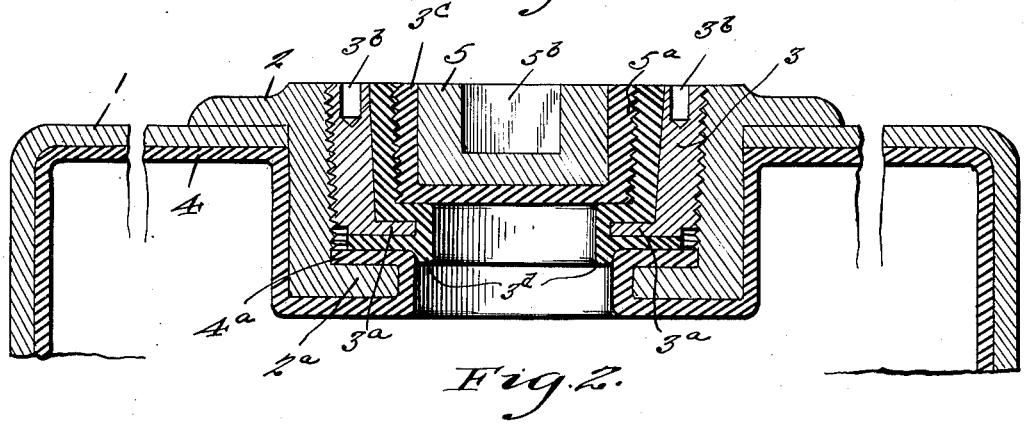
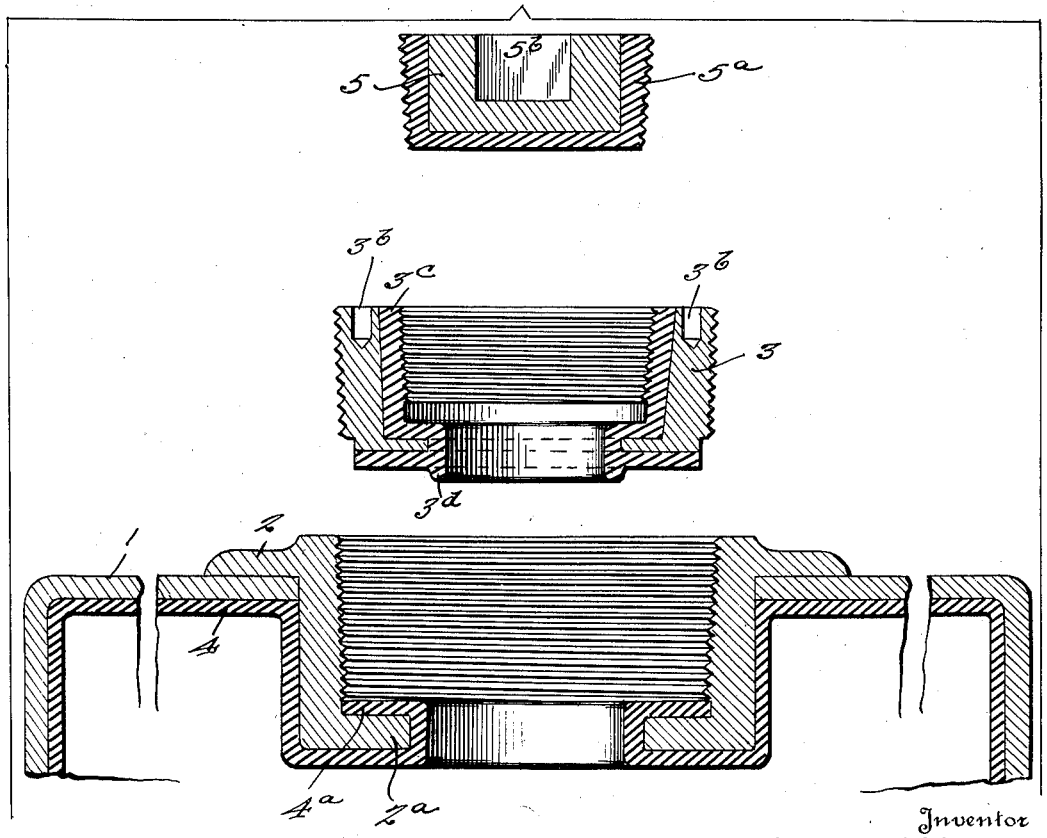
Inventor
Richard T. Griffiths
By Spoon Middleton Donaldson & Hall
Attorney Patented June 2, 1925.

1,540,554

UNITED STATES PATENT OFFICE.

RICHARD T. GRIFFITHS, OF AKRON, OHIO, ASSIGNOR TO THE MILLER RUBBER COMPANY, OF AKRON, OHIO, A CORPORATION OF OHIO.

ACID-PROOF CONTAINER.

Application filed October 2, 1924. Serial No. 741,170.

*To all whom it may concern:*

Be it known that I, RICHARD T. GRIFFITHS, a citizen of the United States, and resident of Akron, in the county of Summit and State of Ohio, have invented certain new and useful Improvements in Acid-Proof Containers, of which the following is a specification.

My present invention relates to improvements in rubber lined proof containers, and concerns more particularly the bung openings thereof.

Difficulty has heretofore been experienced in providing a rubber-lined acid-proof container with a bung opening which would permanently remain acid-proof, and the present invention aims to provide a construction in which there will be no danger of rupture of the lining adjacent the bung, or leakage or corrosive action at that point.

With this and other objects in view, the invention includes the novel features of construction and arrangement and combination of parts hereinafter described, the precise nature and scope of the invention being defined and ascertained by the claims appended hereto.

The invention is illustrated in the accompanying drawing, in which—

Figure 1 is a sectional view showing a sufficient portion of a container (specifically one wall thereof having a bung opening) with the bung and bung-carrying parts, in assembled or closure effecting position.

Fig. 2 is a similar view with the parts separated.

Referring by reference characters to this drawing, the numeral 1 designates a wall of the container, which of course, may be of any desired size or shape, and which is provided with a bung or filling opening which is formed by a ferrule 2 seated in an opening in the wall and secured thereto in any suitable or desired manner, as by welding.

The ferrule is provided at or adjacent its lower end with an inwardly extending annular flange or ledge $2^a$. The rubber lining is indicated at 4 and may be of any desired nature, and either vulcanized or unvulcanized, as desired, and it will be observed that the lining is carried around the lower end of the bushing and up around the flange or ledge, so that a portion of the lining overlies the upper face of said flange or ledge, as indicated at $4^a$.

The numeral 3 indicates a bushing designed to cooperate with the ferrule, being provided with means whereby it may be held within the ferrule with its lower end pressed firmly against said overlying lining portion. Such means may conveniently take the form of internal screw threads on the ferrule and corresponding external screw threads on the bushing, spanner openings $3^b$ being provided by which it may be readily manipulated.

The bushing is preferably provided with an inwardly extending annular flange $3^a$, and its inner and lower faces are provided with a covering layer of hard rubber indicated at $3^c$. When the bushing is screwed home in the ferrule, its bottom hard rubber covering impinges against the overlying lining portion $4^a$ and clamps it firmly against the flange or ledge $2^a$. Preferably I provide the hard rubber covering of the bushing with an annular flange or rib $3^d$ which has a rounded surface and is designed to crowd against the corner of the lining as shown in Fig. 1, thereby assisting in making a tight and permanent joint.

The bushing lining above the flange portion is provided with internal screw threads to coact with corresponding threads on the hard rubber covering $5^a$ of the bung 5, which rubber covering extends across the lower face and coacts with the seat formed by the hard rubber layer above the flange $3^a$ of the bushing.

The bung may be provided with the customary non-circular socket $5^b$ for the reception of a wrench.

Any approved method may be used to secure the rubber to the metal, as will be well understood by those skilled in the art.

Having thus described my invention, what I claim is:—

1. The combination with a metal container provided with an opening the wall of which is provided with an inwardly extending flange, and a rubber lining for the container which is provided with a portion overlying the upper face of said flange, of a clamping bushing having a surface layer of rubber secured thereto, said clamping bushing being held in said opening with its surface layer pressed against said overlying lining portion, and a closure member for said bushing.

2. The combination with a metal container provided with an opening the wall of which is provided with an inwardly extending flange, and a rubber lining for the container which is provided with a portion overlying the upper face of said flange, of a clamping bushing having rubber covered lower and inner faces, said clamping bushing being held in said opening with its lower rubber covered face pressed against the said overlying lining layer, and a rubber covered bung cooperating with the rubber covered inner face of said bushing.

3. In combination, a metal container provided with a substantially cylindrical threaded opening, the wall of which is provided with a ledge at its lower end, a rubber lining for said container having a portion overlying the upper face of said flange, of a bushing having external threads engaging the threads of said opening and having a rubber covered lower face bearing against said overlying lining portion, the inner wall of said bushing having a covering of hard rubber provided with screw threads, and a bung having a hard rubber covering threaded to coact with the threaded hard rubber wall of the bushing.

4. In combination, a metal container provided with a substantially cylindrical threaded opening, the wall of which is provided with a ledge at its lower end, a rubber lining for said container having a portion overlying the upper face of said flange, of a bushing having external threads engaging the threads of said opening and having a rubber covered lower face bearing against said overlying lining portion, and having a depending annular flange, the inner wall of said bushing having a covering of hard rubber provided with screw threads, and a bung having a hard rubber covering threaded to coact with the threaded hard rubber wall of the bushing.

In testimony whereof, I affix my signature.

RICHARD T. GRIFFITHS.